Aug. 13, 1963   B. A. PEAK   3,100,476
ANIMAL TIE-OUT STAKE
Filed March 16, 1962

INVENTOR.
B. A. PEAK
BY
ATTORNEY

United States Patent Office 3,100,476
Patented Aug. 13, 1963

3,100,476
ANIMAL TIE-OUT STAKE
Betsey A. Peak, 540 E. Chestnut, Geneseo, Ill.
Filed Mar. 16, 1962, Ser. No. 180,220
1 Claim. (Cl. 119—121)

This invention relates to an animal tie-out stake for the tethering of dogs and like animals and has for its principal objects the provision of a stake that is simple in design, lends itself to mass-production methods so it can be furnished in quantity at a relatively low cost, includes a swivel connection that prevents wrapping of the chain or tether, and is of quality construction so as to have a long service life. It is a further object to combine the swivel connection at the top of the stake with means serving as a stop or gage to determine the extent of ground penetration of the stake.

The foregoing and other important and desirable features and objects inherent in the invention will become apparent as a preferred embodiment thereof is disclosed in detail in the ensuing description and accompanying sheet of drawings, the figures of which are described below.

Figure 1:
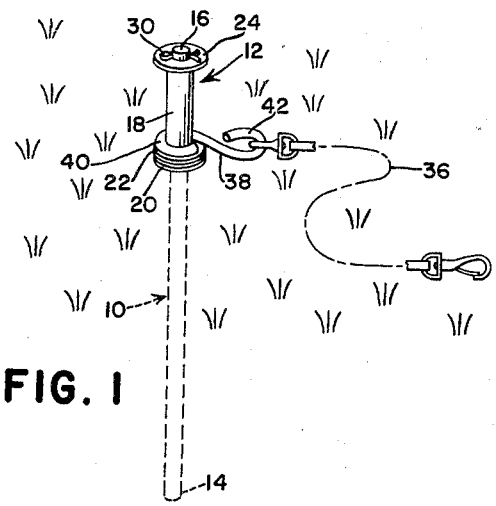
FIGURE 1 is a perspective view on a reduced scale showing the stake in use but omitting the tethered animal.
Figure 2:
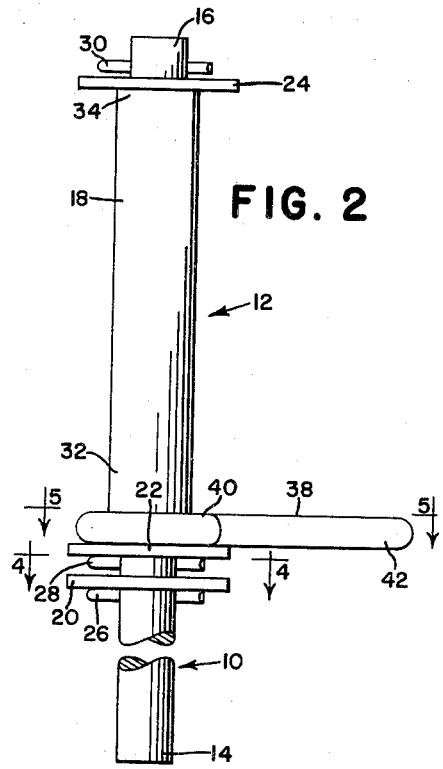
FIGURE 2 is an enlarged elevation of the stake, with intermediate portions omitted.
Figure 3:
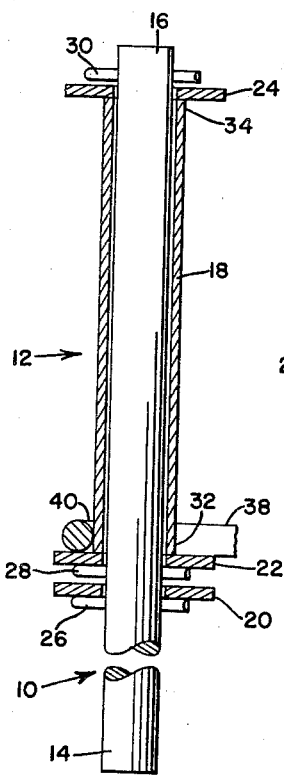
FIGURE 3 is a vertical section on the scale of FIGURE 2.
Figure 4:
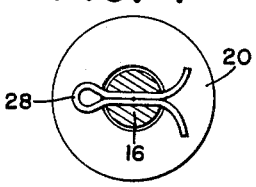
FIGURE 4 is a section on the line 4—4 of FIGURE 2.
Figure 5:
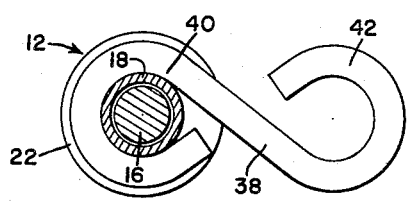
FIGURE 5 is a section on the line 5—5 of FIGURE 2.

The stake comprises a rod 10 having an upper swivel and stop assembly 12, the rod having a lower end 14, which may be driven into the ground, and an upper end 16 which carries the assembly 12. In a commercially acceptable embodiment, the rod may be steel of circular section, its size depending upon the forces expected in its use.

The swivel assembly includes a steel or equivalent sleeve or tube 18, three washers 20, 22 and 24, and three retainers or pins 26, 28 and 30.

The washer 20 is a lower or stop washer, confined against axial displacement on the upper end of the rod, at a position spaced downwardly from the top of the rod, by two of the pins 26 and 28, the rod being drilled diametrically to receive the pins, one above and one below the washer. This washer, so located and fixed, serves as a stop or abutment engageable with the ground to determine the extent of penetration by the rod.

The washer 22 fits the rod loosely and rests on the upper pin 28, serving thus as a bearing washing on which the lower end 32 of the sleeve rests or bears. The third washer 24 fits loosely on the rod and rests on the upper end 34 of the sleeve and is confined to the rod by the third pin 30, the rod being diametrically drilled to receive this pin, which functions as a retainer.

Since the sleeve 18 is loose on the rod between the washers 22 and 24, it may turn or rotate relative to the rod, which is fixed to the ground. A tether or similar animal-restraining means, as at 36, is connectible to the sleeve 18 via connecting means, here in the form of an S-hook 38 having one eye 40 embracing the sleeve and its other eye 42 connected to the tether. The inside diameter of the eye 40 may be slightly larger than the outside diameter of the sleeve 18 but smaller than the outside diameters of the washers so that it may slide axially and turn relative to the sleeve but cannot escape either radially or axially. Of course, when force is applied to the S-hook by the straining animal, the S-hook will rotate or swivel with the sleeve, thus preventing the chain or tether from wrapping up about the stake.

As will be seen, the structure is simple, comprises relatively few but highly effective parts, and is easy and convenient to use. Other features and advantages will of course occur to those versed in the art, as will modifications in the disclosed embodiment, all within the spirit and scope of the invention.

What is claimed is:

An animal tie-out stake, comprising: a rod having a lower ground-penetrating end and an upper end adapted to project above the ground; a stop washer on the rod in downwardly spaced relation to said upper end for engagement with the ground to limit ground penetration of said rod; upper and lower stop pins carried by the rod respectively closely above and below the stop washer to confine said washer against shifting lengthwise of the rod; a bearing washer on the rod next above and resting on the upper stop pin; a sleeve coaxially loosely received on the rod for turning thereon and having a lower end bearing on the bearing washer and an upper end terminating axially short of the upper end of the rod, said sleeve having an outside diameter less than that of said bearing washer; a top washer on the rod and engageable with the upper end of the sleeve and having a diameter greater than the outside diameter of the sleeve; a lock pin carried by the rod above and engageable with the top washer; and means on the sleeve for connection to an animal-restraining element, including the hook having an eye embracing the sleeve between the top and bearing washers and confined by said washers against axial removal from said sleeve, and said lock pin being removable from the rod to enable removal of said top washer.

References Cited in the file of this patent
UNITED STATES PATENTS

| | | |
|---|---|---|
| 1,268,459 | Hjermstad | June 4, 1918 |
| 2,087,176 | Webb | July 13, 1937 |
| 2,812,743 | Dustin | Nov. 12, 1957 |